US011376645B2

(12) United States Patent
Ageba et al.

(10) Patent No.: US 11,376,645 B2
(45) Date of Patent: Jul. 5, 2022

(54) SHEET MATERIAL PRESS FORMING METHOD

(71) Applicant: JFE STEEL CORPORATION, Tokyo (JP)

(72) Inventors: Ryo Ageba, Tokyo (JP); Akinobu Ishiwatari, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 16/754,743

(22) PCT Filed: Sep. 12, 2018

(86) PCT No.: PCT/JP2018/033855
§ 371 (c)(1),
(2) Date: Apr. 9, 2020

(87) PCT Pub. No.: WO2019/097829
PCT Pub. Date: May 23, 2019

(65) Prior Publication Data
US 2020/0316667 A1 Oct. 8, 2020

(30) Foreign Application Priority Data

Nov. 15, 2017 (JP) .............................. JP2017-220224

(51) Int. Cl.
*B21D 22/26* (2006.01)
*B21D 22/02* (2006.01)
*G06F 30/23* (2020.01)

(52) U.S. Cl.
CPC ............. *B21D 22/02* (2013.01); *B21D 22/26* (2013.01); *G06F 30/23* (2020.01)

(58) Field of Classification Search
CPC ...... B21D 22/02; B21D 22/06; B21D 22/027; B21D 22/10; B21D 22/20; B21D 22/21;
(Continued)

(56) References Cited

U.S. PATENT DOCUMENTS 9,921,572 B2 * 3/2018 Dos Reis Alipio da Cruz ............ G06F 30/15
2009/0272171 A1 * 11/2009 Golovashchenko .... G06F 30/23
72/348
(Continued)

FOREIGN PATENT DOCUMENTS

JP 2006139447 A 6/2006
JP 2006185228 A 7/2006
(Continued)

OTHER PUBLICATIONS

Dec. 11, 2018, International Search Report issued in the International Patent Application No. PCT/JP2018/033855.
(Continued)

*Primary Examiner* — Edward T Tolan
(74) *Attorney, Agent, or Firm* — Kenja IP Law PC

(57) ABSTRACT

Provided is a sheet material press forming method of press forming a formed part including a top portion with a protrusion having a blockage protrusive shape, the method including: preforming a high-strength steel sheet; and then forming it into a target shape without fractures or wrinkles, which is achieved by determining a shape in the preforming by press forming analysis according to the following steps: S1: the region of the protrusion having the target shape is discretized into two-dimensional elements and nodes for finite element analysis; and S2: the discretized portion are applied with internal stress in the normal directions of the two-dimensional elements from the inside of the discretized portion and deformed under the following conditions: (a) the two-dimensional elements are deformed within an elastic deformation range; and (b) adjacent ones of the two-dimensional elements have an angle therebetween which is free to change.

1 Claim, 18 Drawing Sheets

(58) Field of Classification Search
CPC ........ B21D 22/22; B21D 22/24; B21D 22/26; G06F 30/23; G06F 2113/24; G06F 2119/18

See application file for complete search history.

(56) References Cited

U.S. PATENT DOCUMENTS

| | | | |
|---|---|---|---|
| 2012/0059865 A1* | 3/2012 | Shao | G06F 17/13 708/270 |
| 2016/0160311 A1 | 6/2016 | Nakagawa et al. | |
| 2018/0185899 A1 | 7/2018 | Saito et al. | |

FOREIGN PATENT DOCUMENTS

| | | |
|---|---|---|
| JP | 2008006464 A | 1/2008 |
| JP | 2015139782 A | 8/2015 |
| JP | 5867657 B2 | 2/2016 |
| WO | 2017006793 A1 | 1/2017 |

OTHER PUBLICATIONS

Mar. 15, 2021, Office Action issued by the Korean Intellectual Property Office in the corresponding Korean Patent Application No. 10-2020-7013738 with English language concise statement of relevance.

Nov. 2, 2021, Office Action issued by the China National Intellectual Property Administration in the corresponding Chinese Patent Application No. 201880073714.1 with English language search report.

* cited by examiner

After application of internal pressure

Target shape

Shallow draw forming → Crash forming with pad

After application of internal pressure

Target shape

SHEET MATERIAL PRESS FORMING METHOD

TECHNICAL FIELD

This disclosure relates to a sheet material press forming method which makes it possible to stably obtain a target shape while preventing fracture of a metal blank when parts such as automotive parts are manufactured from the metal blank by press forming.

BACKGROUND

Recently, in view of global environmental issues, high-strength steel sheets have been used frequently as automotive parts for weight reduction of an automotive body.

Further, automotive parts are often manufactured using press forming excellent in terms of manufacturing costs.

However, since high-strength steel sheets have low ductility and easily suffer fractures, compared to low-strength steel sheets, it is not always easy to obtain parts having a target shape by press forming.

Further, strengthening of steel sheets to be used for automotive body weight reduction means thinning of steel sheets, and as the sheet thickness of a steel sheet is made thinner, press wrinkles tend to be caused.

Therefore, the development of a press forming method is strongly required to suppress fractures and press wrinkles.

WO 2017/006793 A (PTL 1) and JP 5867657 B (PTL 2) describe a method in which a preformed shape having no fractures or press wrinkles is manufactured and subsequently subjected to press forming to thereby obtain a product having no fractures or press wrinkles.

CITATION LIST

Patent Literature

PTL 1: WO 2017/006793 A
PTL 2: JP 5867657 B

SUMMARY

Technical Problem

As a method for suppressing fractures during press forming, it is considered useful to prepare a rough preformed shape as a preforming step and subsequently subject the preformed shape to restrike forming to obtain a target shape.

PTL 1 and PTL 2 each propose a method of preparing a preformed shape for suppressing fractures and subsequently subjecting the preformed shape to restrike forming.

However, since PTL 1 uses the large scale of inflow and rotation of materials in a subsequent process, the method of PTL 1 can be applied only to a fracture risk portion of a flange portion, which has an open periphery and at which a metallic sheet is allowed to move easily.

Further, although PTL 2 indicates the design guideline of a preformed shape in order to suppress forming failure inside a product, PTL 2 merely discusses changing of shapes in cross sections taken by dividing a final shape in a grid pattern or taken radially from the centroid. A metallic sheet is not necessarily deformed in grid-like directions or radially from the centroid during actual restrike forming but deformed three-dimensionally in arbitrary directions. Thus, when a preformed shape is designed without considering this point, it is impossible to control the inflow of the metallic sheet. Further, the method of PTL 2 is markedly labor intensive and time consuming.

This disclosure could thus be helpful to provide a sheet material press forming method in which, considering three-dimensional deformation, press forming is divided into two steps, in which a sheet material is preformed into a shape having the same surface area as a target shape and easy to form in the first step and subsequently formed into the target shape without fractures.

Solution to Problem

That is, the primary features of this disclosure are as follows.
1. A sheet material press forming method of press forming a formed part having a hat-like cross-sectional shape and including a top portion, a side wall portion, and a flange portion, the top portion having a protrusion with a blockage protrusive shape, from a metal blank, the method comprising:

first, for the top portion in a region of the protrusion, determining, by press forming analysis, a preforming shape which has almost the same surface area as a target shape and is easy to form according to the following steps S1 and S2;

then, press forming the metal blank into the preforming shape, and subsequently crash forming a pertinent portion of the metal blank into a target final shape, where S1: the region of the protrusion having the target shape is discretized into two-dimensional elements and nodes for finite element analysis, and S2: a discretized portion is applied with internal stress in normal directions of the two-dimensional elements from the inside of the discretized portion and deformed under the following conditions:

(a) the two-dimensional elements are deformed within an elastic deformation range; and (b) adjacent ones of the two-dimensional elements have an angle therebetween which is free to change.

Advantageous Effect

According to this disclosure, when a formed part having a hat-like cross-sectional shape and including a top portion, a side wall portion, and a flange portion, the top portion having a protrusion having a protrusive shape with a closed periphery, is formed from a metal blank, it is possible to automatically design an optimal preformed shape by finite element analysis, and as a result, press forming can be performed from a metal blank without causing fractures or press wrinkles.

DETAILED DESCRIPTION

The following describes the present disclosure in detail.

Figure 1:
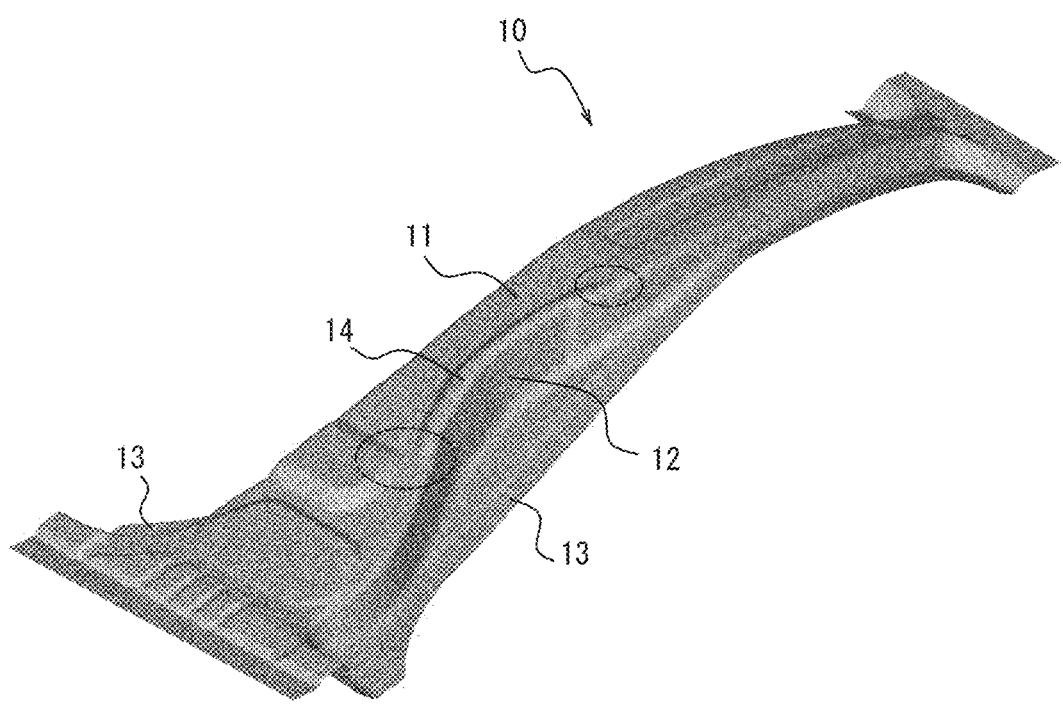
FIG. 1 illustrates a formed part including a top portion having a protrusion with a blockage protrusive shape.

For example, as illustrated in FIG. 1, even if a formed part 10 having a hat-like cross-sectional shape and including a top portion 11, a side wall portion 12, and a flange portion 13, the top portion 11 having a protrusion 14 having a protrusive shape with a closed periphery, that is, a blockage protrusive shape is formed in a single step using a tool of press forming, when a target shape is complicated and a used metallic sheet has low ductility, a fracture occurs near the protrusion and a product having a target shape cannot be obtained.

In order to solve this problem, a method of dividing the press forming process into a plurality of steps is sometimes used. That is, press forming is performed to form a rough shape in a preforming step and press forming is performed again (restrike) in the subsequent step to obtain a target shape. At that time, a shape formed in the preforming step (hereinafter, referred to as "preformed shape") has been conventionally designed depending on design expert's experience and know-how.

Recently, a design has been made based on the idea of taking, in a preformed shape, product cross sections including fracture regions in a grid pattern or radially from the centroid, deforming the preformed shape, keeping the cross-sectional line lengths of the cross sections in a suitable range to thereby suppress the elongation and contraction of a metallic sheet in the restrike step, which makes it possible to obtain a product without fractures or wrinkles (for example, PTL 2).

However, the metallic sheet during restrike is rarely deformed in the cross sections in a grid-like form or taken radially from the centroid. Typically, the metallic sheet moves three dimensionally in arbitrarily directions almost across the entire region. Therefore, only with the idea of matching the cross-sectional line lengths described in PTL 2, failures such as fractures and wrinkles often occur during the restrike, and trials and errors need to be repeated to determine the shape of the preformed shape. In the worst case, an optimal shape of the preformed shape may not be determined.

Therefore, to deal with three-dimensional deformation of the metallic sheet which cannot be dealt with relying on the idea of using the cross-sectional line length, the inventors conceived of determining an optimal preformed shape by using a three-dimensional finite element method as press forming analysis.

Figure 2A:
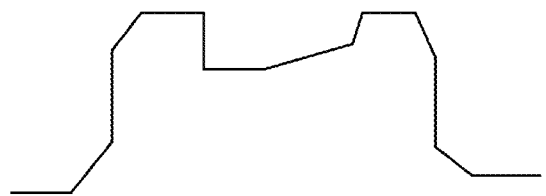
FIG. 2A is a schematic diagram indicating the concept of this disclosure and illustrates one example of target shapes of the protrusion.
Figure 2A:
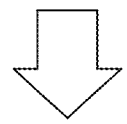
Figure 2B:
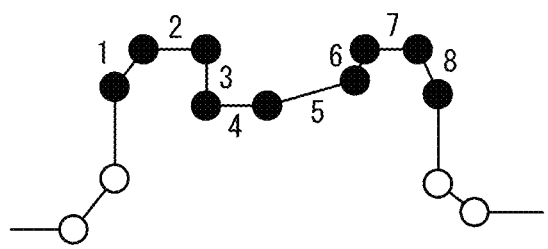
FIG. 2B illustrates a state in which the protrusion is discretized into two-dimensional elements and nodes.
Figure 2B:
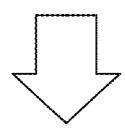
Figure 2C:
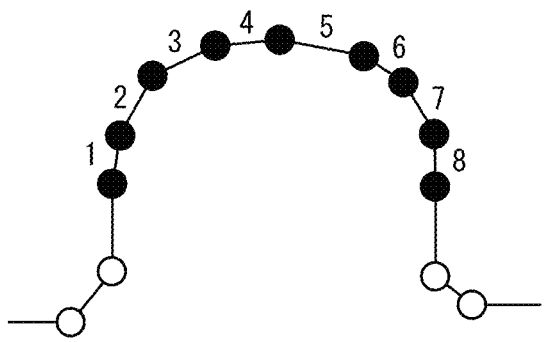
FIG. 2C illustrates a preformed shape of the protrusion.

The following describes the concept of this disclosure based on FIGS. 2A to 2C.

FIG. 2A illustrates one example of the target shape of the protrusion. Although FIGS. 2A to 2C illustrate a two-dimensional cross section to illustrate clearly, it is necessary to consider a three-dimensional shape in practice.

Then, protrusion regions 1 to 8 to form the target shape are discretized into two-dimensional elements and nodes (making a mesh) as illustrated in FIG. 2B. It is preferable to make the distance between adjacent ones of the nodes indicated by Nos. 1 to 8 as equal as possible.

Then, using the finite element method, a rough preformed shape which makes forming of a final shape easy in the subsequent step is determined (FIG. 2C). At that time, it is preferable that the sides connected by the nodes bend freely and that the determined rough preformed shape has approximately the same surface area as the target shape.

Specifically, internal stress is applied to the discretized portion from the inside in normal directions of the two-dimensional elements (also referred to as "shell elements") to determine the preformed shape. Important points are (a) the two-dimensional elements should be deformed within an elastic deformation range and (b) an angle between adjacent ones of the the two-dimensional elements should be free to change.

Thus, the rough preformed shape is determined as illustrated in FIG. 2C.

Next, in actual press forming, a tool of press forming having the preformed shape determined as described above (FIG. 2C) is made, and a blank is formed into the preformed shape and subsequently formed into the target shape (FIG. 2A) by restrike.

Next, specific procedures using the above method will be described.

Figure 3A:
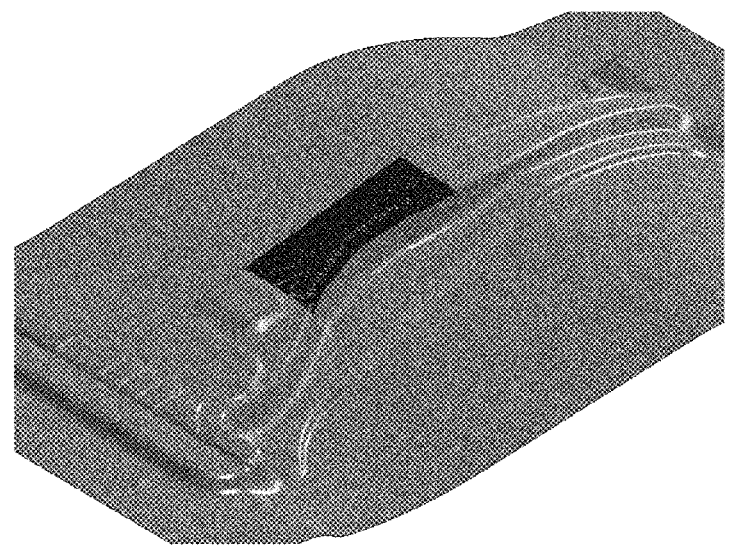
FIG. 3A illustrates a state in which a surrounding portion of the projection is discretized.
Figure 3B:
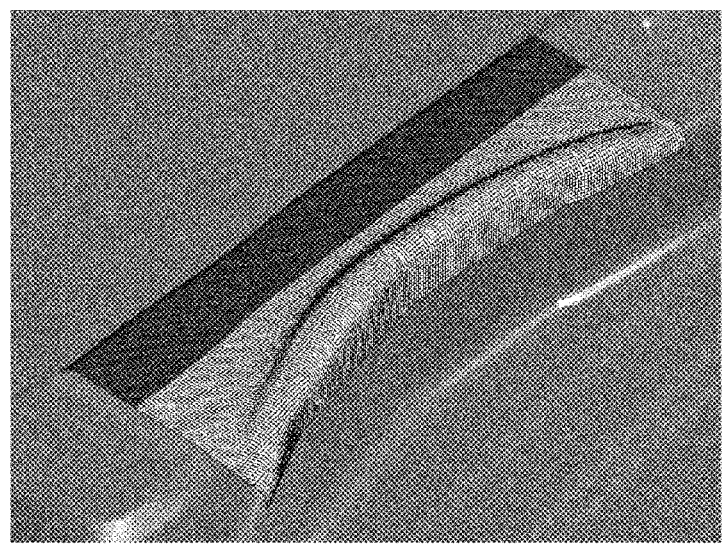
FIG. 3B is an enlarged view of an essential part of FIG. 3A.

First, a connection ridge portion between the top portion 11 and the side wall portion 12, including a portion where fractures or wrinkles may occur in the target shape illustrated in FIG. 1, is discretized into two-dimensional elements and nodes, adjacent nodes are connected by a line segment, and a region surrounded by the line segments is determined as a two-dimensional element (making a mesh). This schematic diagram is illustrated in FIG. 3A. FIG. 3B is an enlarged view of an essential part. At that time, the distance between discretized nodes is not particularly limited, but it is preferably set to about 50% to 300% of the sheet thickness.

Next, finite element analysis in which the two-dimensional elements constituting the discretized portion are applied with internal pressure from the inside of the discretized portion in normal directions of the two-dimensional elements for deformation is performed. At that time, the analysis is performed under conditions that the two-dimensional elements are deformed within the elastic deformation range and an angle between adjacent two-dimensional elements are free to change.

Figure 4A:
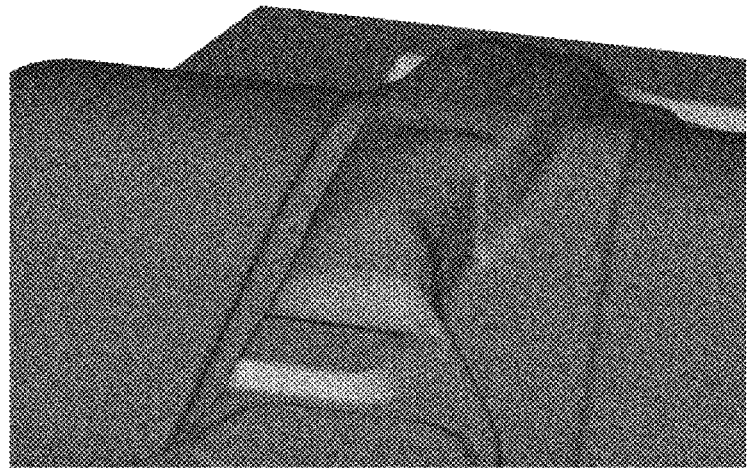
FIG. 4A illustrates the shape of a preformed shape after the discretized portion is applied with internal pressure.
Figure 4B:
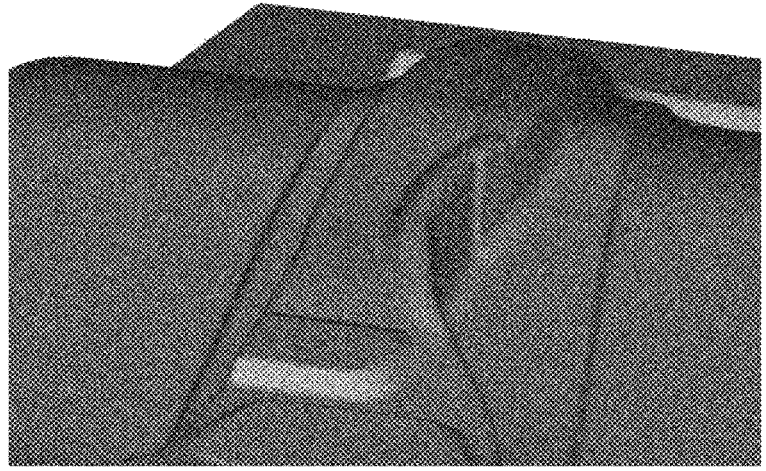
FIG. 4B illustrates a target shape of the discretized portion.

Thus, the shape of the preformed shape which is easy to form since the shape is rougher than the target shape and has the same surface area as the target shape can be readily obtained. One example of the shape of the preformed shape thus obtained is illustrated in FIG. 4A. FIG. 4A illustrates the shape of the preformed shape after the application of internal pressure and FIG. 4B illustrates the target shape.

The preformed shape thus obtained has a rougher shape than the target shape and can avoid local deformation and stress concentration, and thus, it is free from fractures or wrinkles. Further, when the preformed shape is crash formed into the target shape, bending deformation is only applied to the two-dimensional elements and nodes in the crash forming, and thus the two-dimensional elements are less easily deformed. Accordingly, the preformed shape can be obtained without fractures or wrinkles, and when the preformed shape is press formed into the target shape, additional elongation or contraction will not occur. Thus, the target shape can be eventually obtained without fractures or wrinkles.

EXAMPLES

Example 1

A part having a shape illustrated in FIG. 1 was manufactured by press forming. The metallic sheet of the part was a steel sheet having a tensile strength of 1180 MPa and a sheet thickness of 1.2 mm.

A method having only one step of draw forming was used as a conventional method (conventional method 1).

Figure 5A:
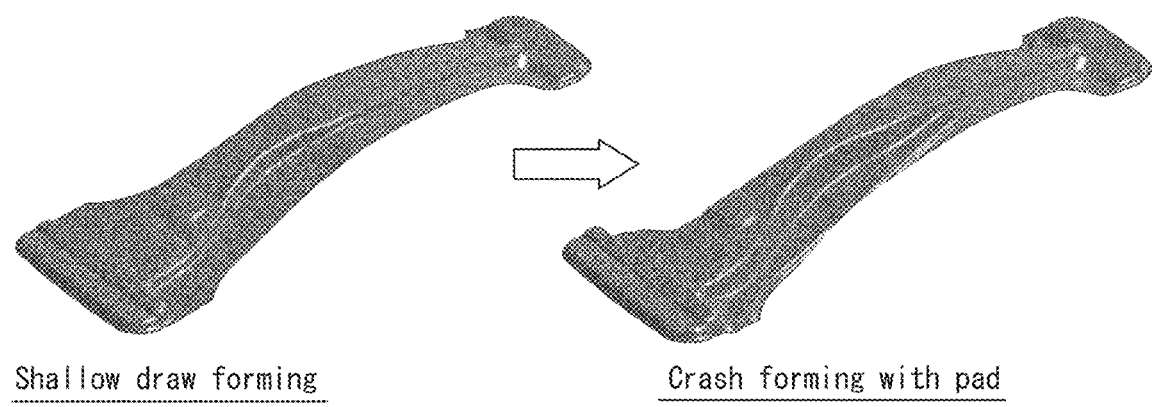
FIG. 5A illustrates a comparative method including a first step of shallow draw forming and a second step of bending deformation with pad.
Figure 5B:
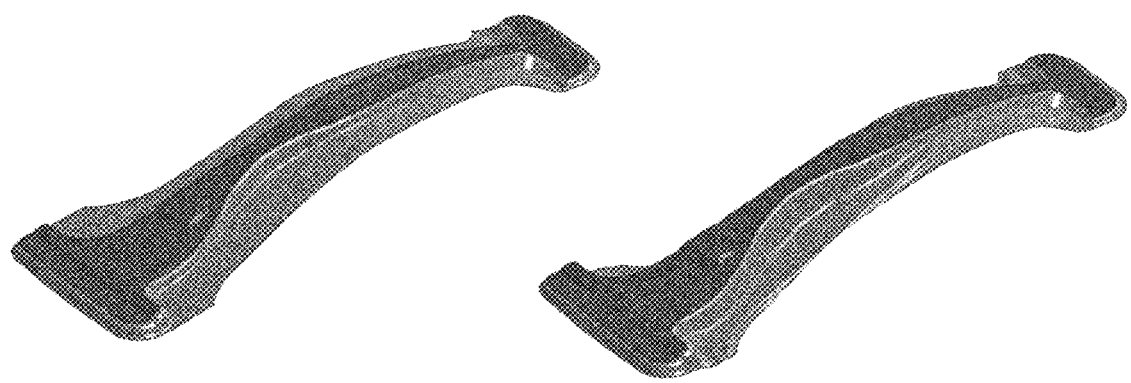
FIG. 5B illustrates a position at which the pad is held in FIG. 5A.

A method having a first step of shallow draw forming and a second step of crash forming with pad as illustrated in FIG. 5A was used as a comparative method (comparative method 1). FIG. 5A illustrates a formed shape and FIG. 5B illustrates a position at which the pad is held.

The disclosed method had a first step of draw forming and a second step of crash forming (disclosed method 1).

Figure 6:
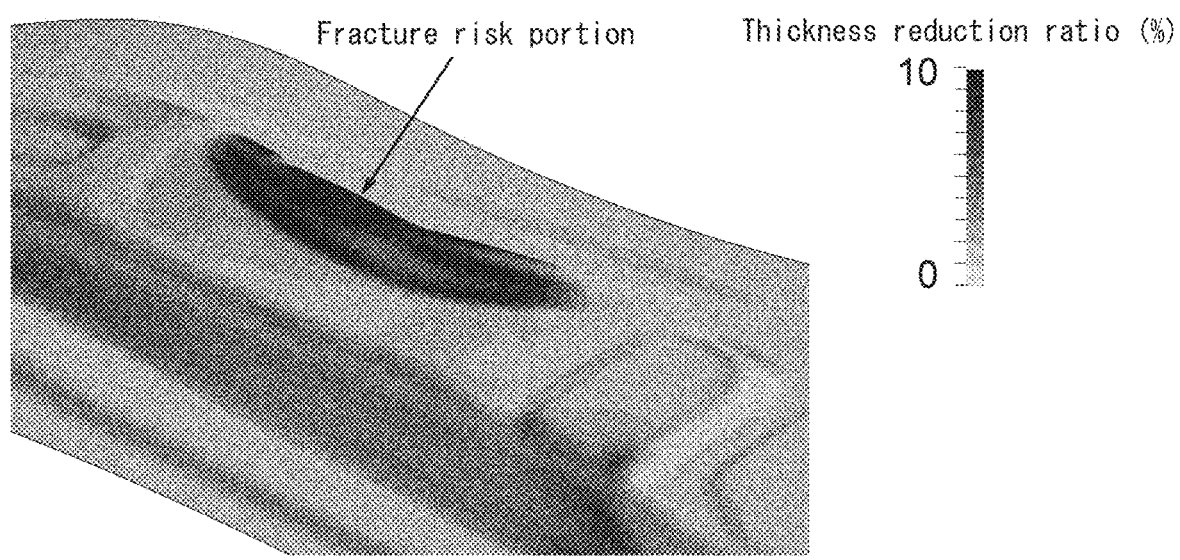
FIG. 6 illustrates a thickness reduction ratio when a conventional method 1 is used for forming.

First, a forming result of the conventional method 1 is illustrated in FIG. 6. As illustrated in FIG. 6, using the conventional method 1, a large local thickness reduction occurred, which might lead to fraction.

Figure 7:
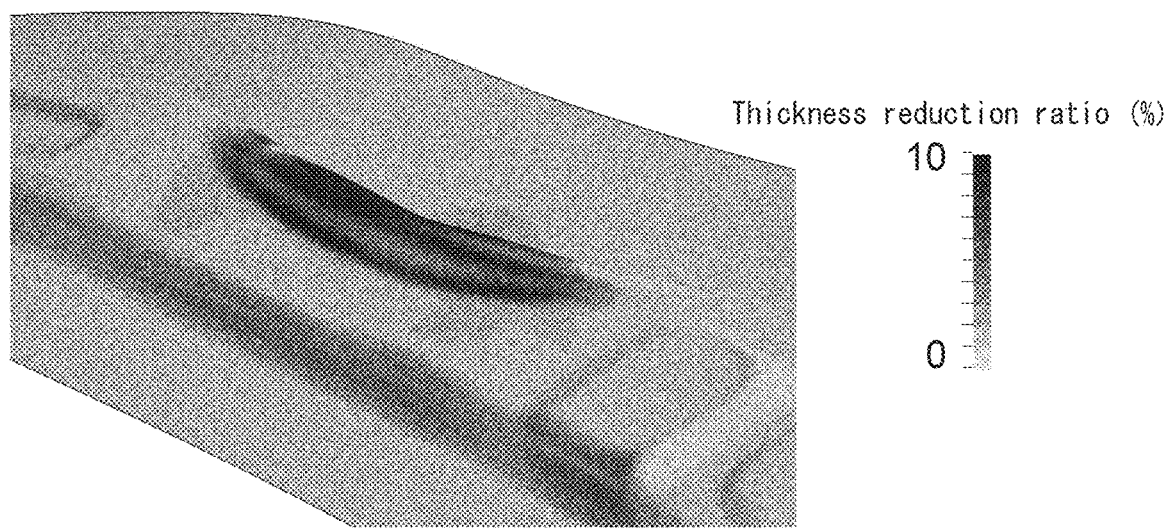
FIG. 7 illustrates a thickness reduction ratio during shallow draw forming (first step) in a comparative method 1.
Figure 8:
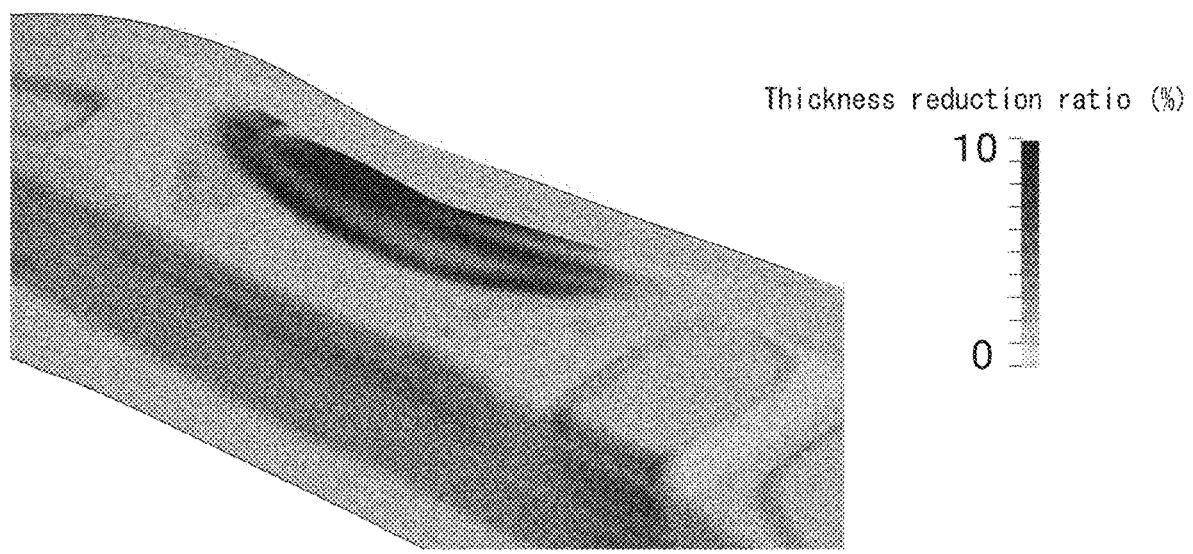
FIG. 8 illustrates a thickness reduction ratio during bending deformation with pad (second step) in the comparative method 1.

Further, using the comparative method 1, a result of shallow draw forming of the preformed shape is illustrated in FIG. 7 and a result of subjecting the preformed shape to crash forming with pad to obtain a target shape is illustrated in FIG. 8. When the comparative method 1 was used, local thickness reduction occurred during the draw forming as the first step and the crash forming with pad as the second step and there was a concern that a fracture might occur from this portion.

Figure 9:
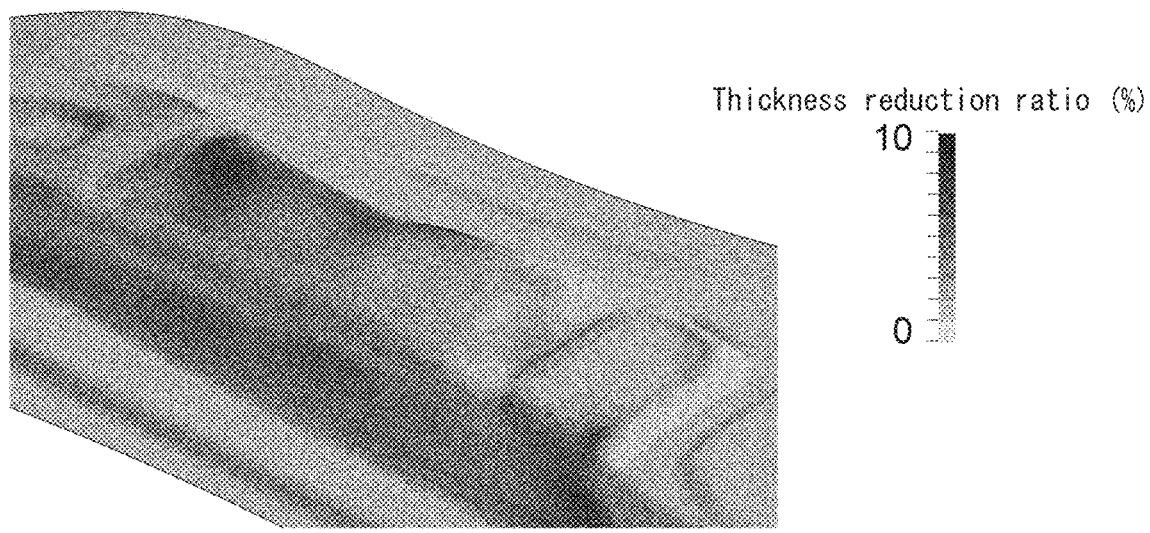
FIG. 9 illustrates a thickness reduction ratio when a preformed shape is formed according to a disclosed method 1.

Next, in performing the disclosed method 1, the preformed shape was subjected to press forming analysis by the finite element method. As illustrated in FIGS. 3A and 3B, a part of the side wall portion and the top portion were discretized into two-dimensional elements and nodes. In the discretization, the interval between adjacent nodes was set to about 1.2 mm which was roughly equivalent to the sheet thickness. Then, the two-dimensional elements were applied with internal pressure in the normal directions using finite element analysis. The result is illustrated in FIG. 4A. The shape illustrated in FIG. 4A was regarded as the shape of the preformed shape. A tool of press forming was prepared and the preformed shape was draw formed using the tool. The result is illustrated in FIG. 9. Comparing FIG. 9 with not only FIG. 6 but also FIGS. 7 and 8, it can be seen that the thickness reduction was mitigated to prevent fractures.

Figure 10:
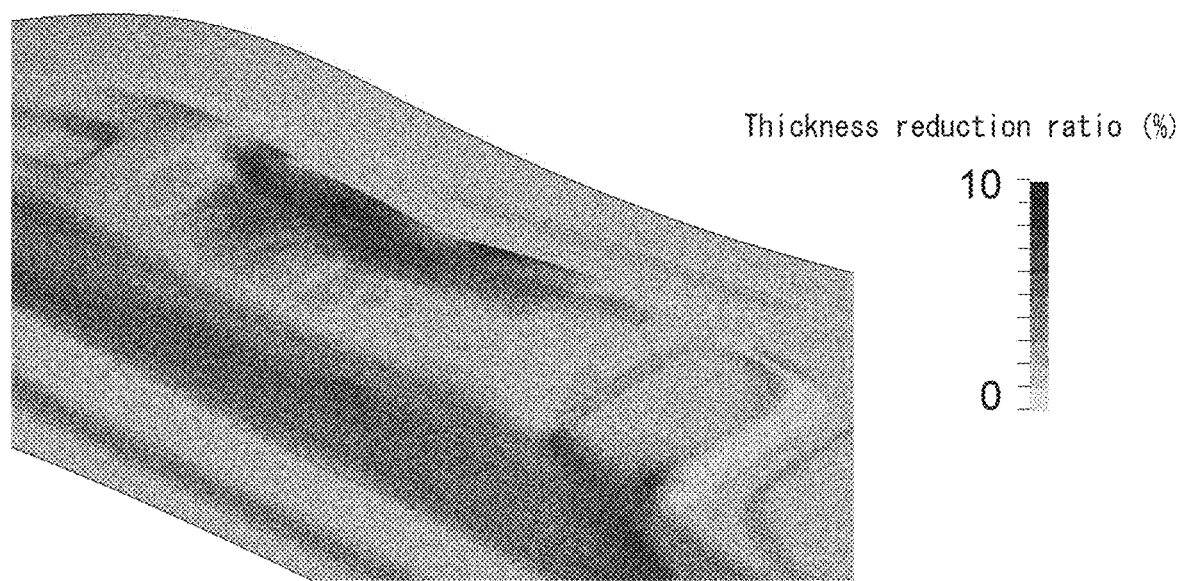
FIG. 10 illustrates a thickness reduction ratio when a target shape is formed according to the disclosed method 1.

Furthermore, a result of crash forming, as the second step, using a tool of press forming having the target shape is illustrated in FIG. 10. Since no significant thickness reduction occurred in the second step and no fracture occurred, it was confirmed that the method according to this disclosure is effective.

Example 2

Figure 11:
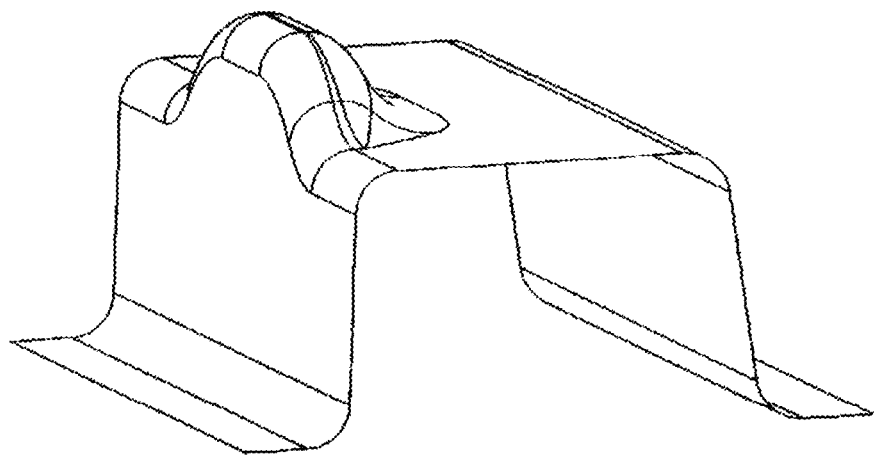
FIG. 11 illustrates the shape of a part to be used in Example 2.

A part having a shape illustrated in FIG. 11 was manufactured by press forming. The metallic sheet of the part was a steel sheet having a tensile strength of 1180 MPa and a sheet thickness of 1.2 mm.

As in Example 1, a method having only one step of draw forming was used as a conventional method (conventional method 2).

A method having a first step of shallow draw forming and a second step of crash forming with pad was used as a comparative method (comparative method 2).

The disclosed method had a first step of draw forming and a second step of crash forming (disclosed method 2).

Figure 12:
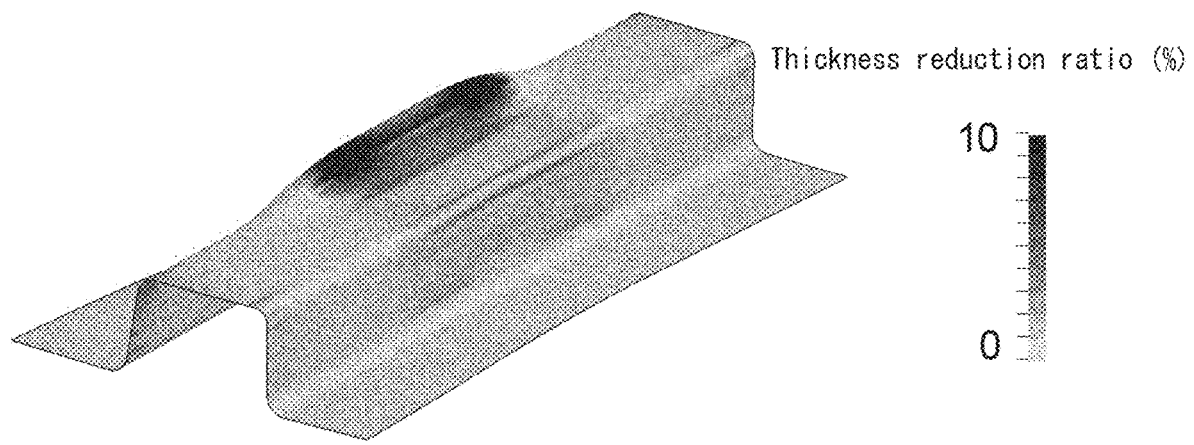
FIG. 12 illustrates a thickness reduction ratio when the part to be used in Example 2 is formed according to a conventional method 2.

First, a forming result of the conventional method 2 is illustrated in FIG. 12.

As illustrated in FIG. 12, using the conventional method 2, a large local thickness reduction occurred, which might lead to fraction.

Figure 13:
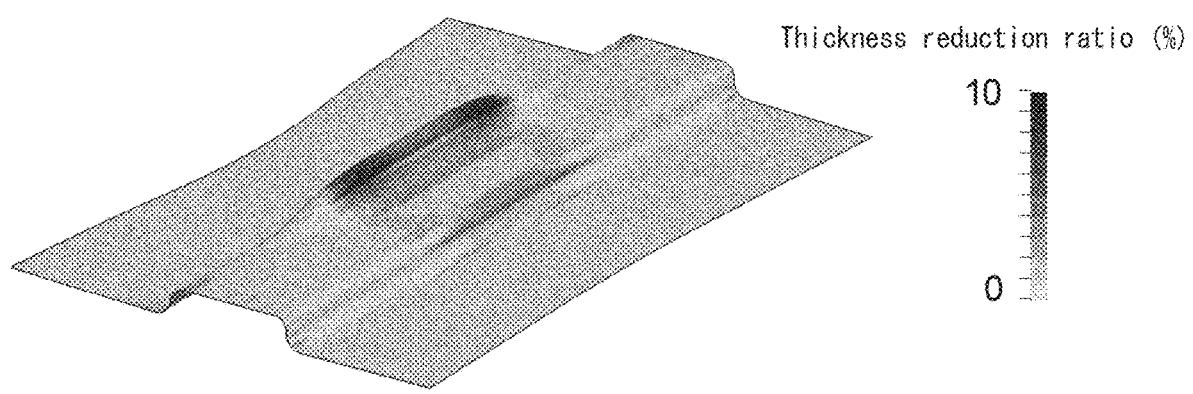
FIG. 13 illustrates a thickness reduction ratio of the part to be formed in Example 2 during shallow draw forming (first step) in a comparative method 2.
Figure 14:
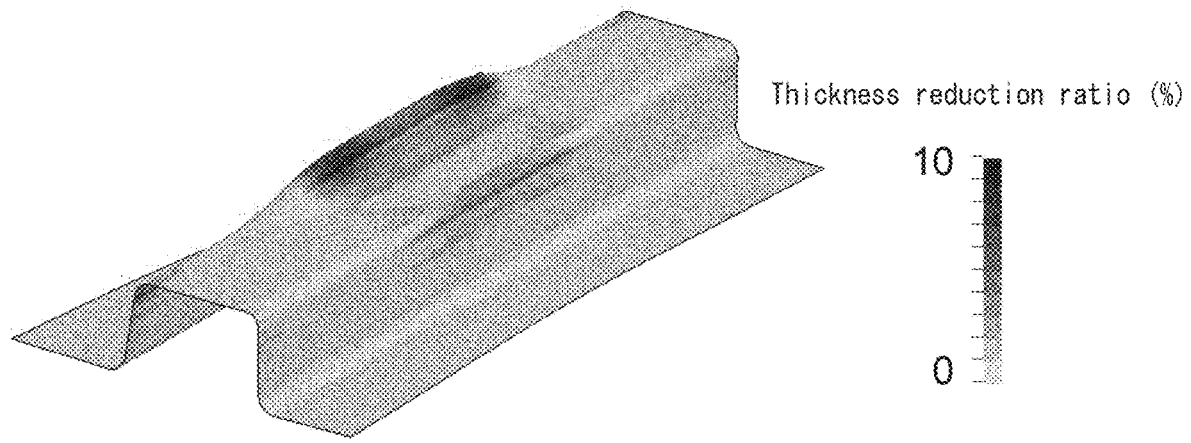
FIG. 14 illustrates a thickness reduction ratio of the part to be formed in Example 2 during bending deformation with pad (second step) in the comparative method 2.

Further, using the comparative method 2, a result of shallow draw forming is illustrated in FIG. 13 and a result of the crash forming with pad of the comparative method 2 is illustrated in FIG. 14. When the comparative method 2 was used, local thickness reduction occurred during the draw forming as the first step and the crash forming with pad as the second step and there was also a concern that a fracture might occur from this portion.

Figure 15A:
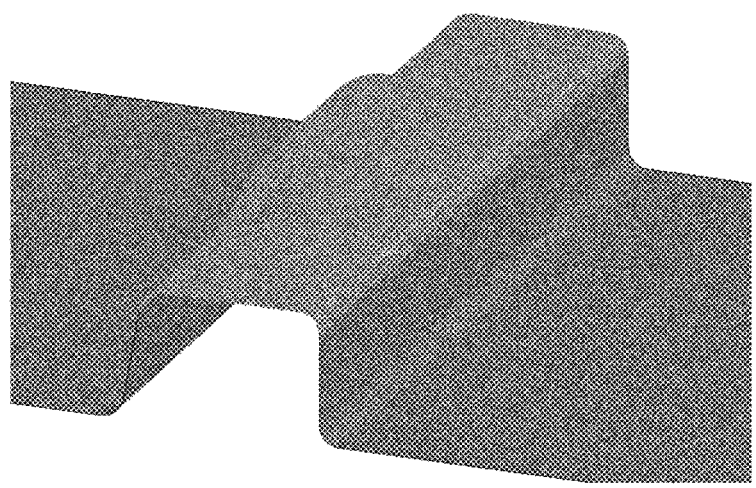
FIG. 15A illustrates a state in which a surrounding portion of a fracture risk portion of the part used in Example 2 is discretized.
Figure 15B:
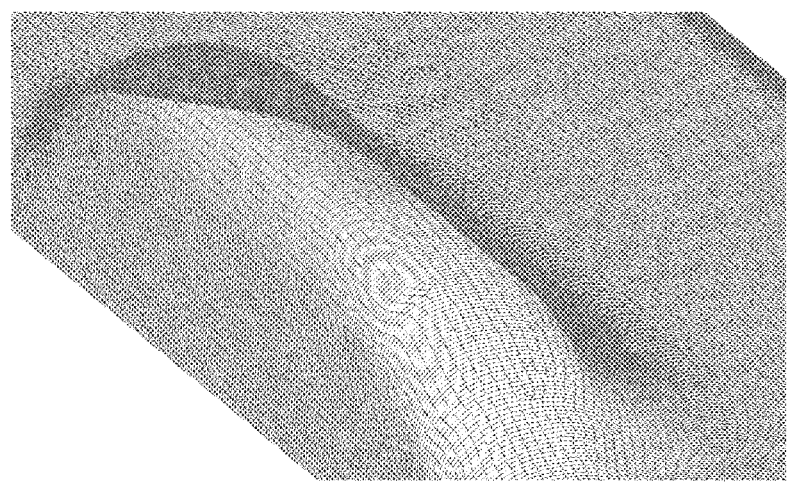
FIG. 15B is an enlarged view of an essential part of FIG. 15A.
Figure 16A:
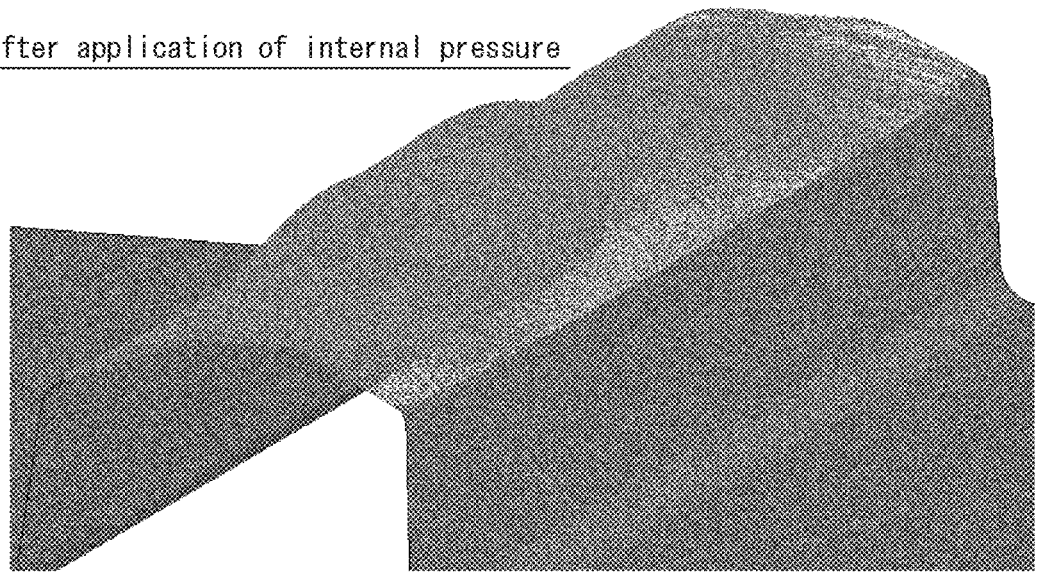
FIG. 16A illustrates the shape of the preformed shape after the discretized portion is applied with internal pressure.
Figure 16B:
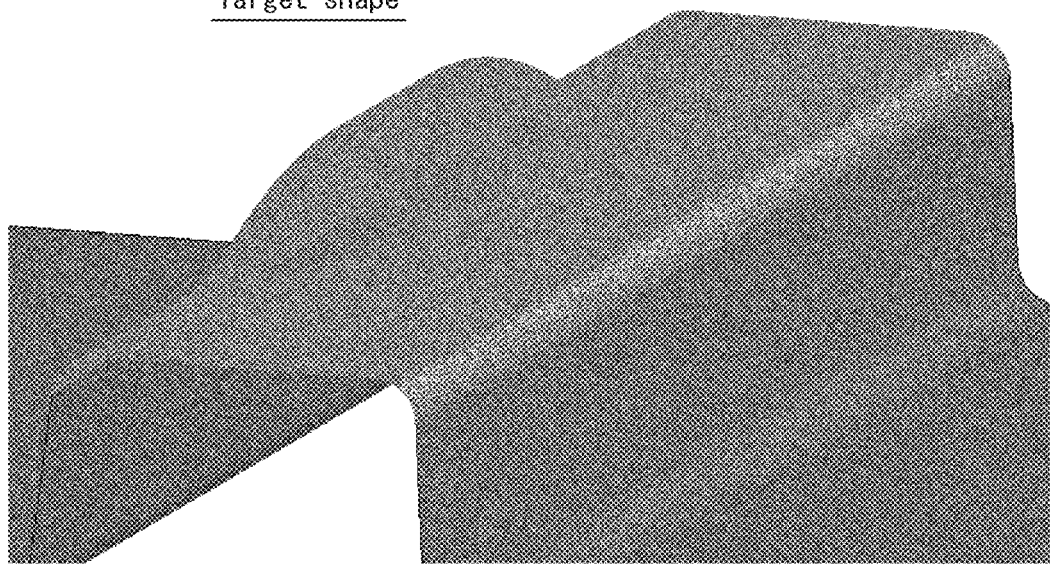
FIG. 16B illustrates a target shape of the discretized portion.
Figure 17:
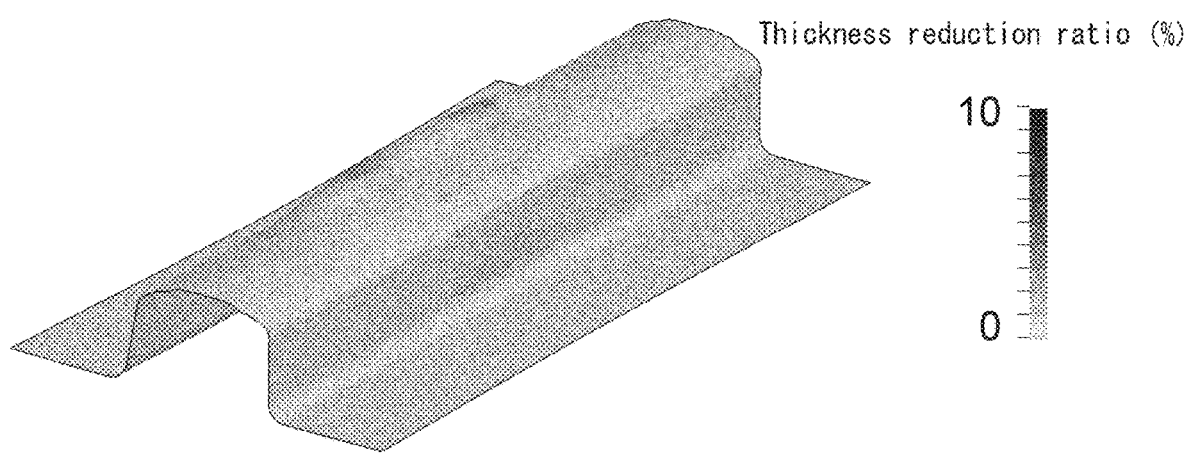
FIG. 17 illustrates a thickness reduction ratio when a preformed shape is formed according to a disclosed method 2.

Next, in performing the disclosed method 2, the preformed shape was subjected to press forming analysis by the finite element method. As illustrated in FIGS. 15A and 15B, a part of the side wall portion and the top portion were discretized into two-dimensional elements and nodes. In the discretization, the interval between adjacent nodes was set to about 1.2 mm which was roughly equivalent to the sheet thickness. Then, the two-dimensional elements were applied with internal pressure in the normal directions using finite element analysis. The result is illustrated in FIG. 16A (FIG. 16B illustrates the target shape). The shape illustrated in FIG. 16A was regarded as the shape of the preformed shape and draw formed using a tool of press forming. The result is illustrated in FIG. 17. Comparing FIG. 17 with not only FIG.

12 but also FIGS. 13 and 14, it can be seen that the thickness reduction was mitigated to prevent fractures.

Figure 18:
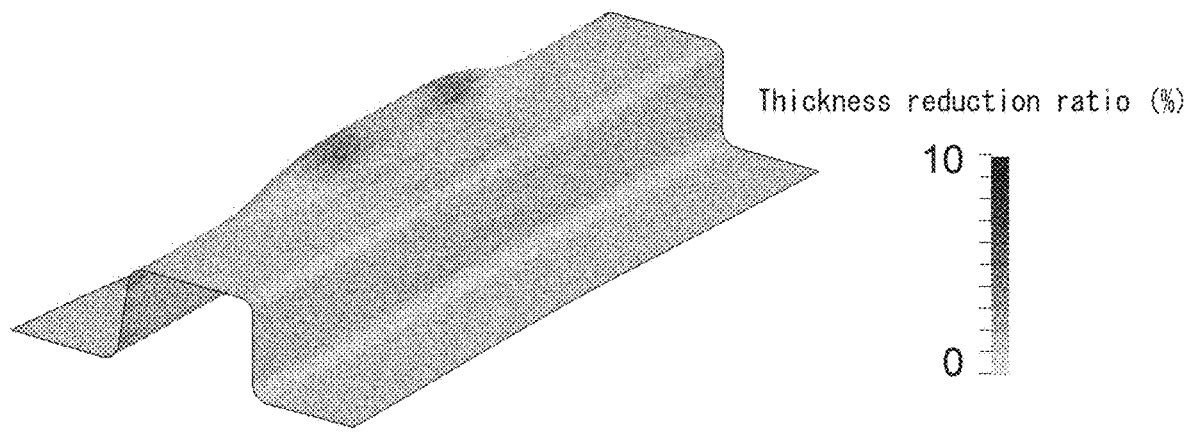
FIG. 18 illustrates a thickness reduction ratio when a target shape is formed according to the disclosed method 2.

Furthermore, a result of crash forming using a tool of draw forming having the target shape as the second step is illustrated in FIG. 18. Since no significant thickness reduction occurred in the second step and no fracture occurred, it was confirmed that the method according to this disclosure is effective.

REFERENCE SIGNS LIST

1 to 8 Nodes of a protrusion region
10 Formed part
11 Top portion
12 Side wall portion
13 Flange portion
14 Protrusion

The invention claimed is:

1. A method of press forming a formed part from a metal blank, the formed part having a target shape with a cross-sectional shape that includes a top portion having a protrusion with a closed periphery, a side wall portion, and a flange portion, the method comprising:
 performing a press forming analysis step of determining, for the top portion in a region of the protrusion, a preforming shape that is rougher than the target shape and has a surface area that is the same as the target shape according to the following steps S1 and S2, where
 S1: discretizing the region of the protrusion having the target shape into two-dimensional elements and nodes for finite element analysis to determine a discretized portion, and
 S2: applying pressure to the discretized portion from inside of a cavity formed by the top portion and the side wall portion, in normal directions of the two-dimensional elements, to deform the discretized portion under the following conditions:
  (a) the two-dimensional elements are deformed within an elastic deformation range; and
  (b) an angle between adjacent two-dimensional elements is free to change out of the elastic deformation range so that sides connected by the nodes bend freely; and
 thereafter, performing an actual press forming step of press forming the metal blank into the preforming shape, and subsequently crash forming, in which bending deformation is applied to the two-dimensional elements and nodes, the metal blank into the target shape.

* * * * *